(12) United States Patent
Brown et al.

(10) Patent No.: US 8,856,215 B2
(45) Date of Patent: Oct. 7, 2014

(54) DETECTING VISIBLE DISPLAY OF CONTENT

(75) Inventors: Michael Brown, Ashburn, VA (US); Randall McCaskill, Vienna, VA (US)

(73) Assignee: comScore, Inc., Reston, VA (US)

( * ) Notice: Subject to any disclaimer, the term of this patent is extended or adjusted under 35 U.S.C. 154(b) by 107 days.

(21) Appl. No.: 13/211,773

(22) Filed: Aug. 17, 2011

(65) Prior Publication Data

US 2012/0047203 A1 Feb. 23, 2012

Related U.S. Application Data

(60) Provisional application No. 61/374,393, filed on Aug. 17, 2010, provisional application No. 61/374,402, filed on Aug. 17, 2010.

(51) Int. Cl.
*G06F 15/16* (2006.01)
*G06Q 30/02* (2012.01)

(52) U.S. Cl.
CPC ...................................... *G06Q 30/02* (2013.01)
USPC ....................................................... 709/203

(58) Field of Classification Search
USPC ................................................ 709/203, 219
See application file for complete search history.

(56) References Cited

U.S. PATENT DOCUMENTS

| 2002/0120505 | A1 | 8/2002 | Henkin et al. |
| 2006/0248442 | A1 | 11/2006 | Rosenstein et al. |
| 2009/0054140 | A1* | 2/2009 | Beser et al. ..................... 463/31 |
| 2010/0211893 | A1* | 8/2010 | Fanning et al. ............... 715/760 |

OTHER PUBLICATIONS

International Search Report in corresponding PCT application PCT/US11/48069 dated Jan. 5, 2012.
Written Opinion of the International Search Authority in corresponding PCT application PCT/US11/48069 dated Jan. 5, 2012.

* cited by examiner

*Primary Examiner* — El Hadji Sall
(74) *Attorney, Agent, or Firm* — Andrew Bodendorf (57) ABSTRACT

A displayable object is accessed and one or more portions of the accessed displayable object are selected. A screenshot of a client system display is accessed and a determination is made that the accessed screenshot includes the one or more selected portions of the displayable object. In response to determining that the accessed screenshot includes the one or more selected portions, display information about the displayable object is determined. The determined display information is sent to a server system.

21 Claims, 3 Drawing Sheets

DETECTING VISIBLE DISPLAY OF CONTENT

CLAIM OF PRIORITY

This application claims priority under 35 USC §119(e) to U.S. Provisional Patent Application Ser. Nos. 61/374,393, filed on Aug. 17, 2010, and 61/374,402, filed Aug. 17, 2010. Both of these applications are hereby incorporated by reference.

BACKGROUND

Internet audience measurement may be useful for a number of reasons. For example, some organizations may want to be able to make claims about the size and growth of their audiences or technologies. In addition, understanding Internet audience visitation and habits, as well as what the end-user experienced, may be useful in supporting advertising planning, buying, and selling. For example, information and reports on what display advertisements have been delivered to end-users, and whether those advertisements were visible, may be useful to some organizations, such as the organizations paying for or being promoted by the advertisements.

SUMMARY

In one aspect, a method includes accessing a displayable object, selecting one or more portions of the accessed displayable object, accessing a screenshot of a client system display, and determining that the accessed screenshot includes the one or more selected portions of the displayable object. The method also includes determining display information about the displayable object in response to determining that the accessed screenshot includes the one or more selected portions and sending the determined display information to a server system.

Implementations may include one or more of the following features. For example, the displayable object may be a component of a web page. The method may also include accessing a set of business rules and determining, based on the accessed business rules, that the accessed displayable object is a web page component to be monitored. The business rules may define web page components to be monitored. For instance, the business rules may designate sizes of displayable objects to be monitored, formats of displayable objects to be monitored, sources of displayable objects to be monitored, or sources of displayable objects to be excluded from monitoring.

The displayable object may be an image. Selecting one or more portions may include dividing the accessed image into multiple sub-frames and selecting a scan line from each of the multiple sub-frames. Determining that the accessed screenshot includes the one or more selected portions may include determining that the accessed screenshot includes at least one of the selected scan lines. Determining display information about the image may include determining a total number of the selected scan lines that are included in the accessed screenshot. The display information may include one or more of a hash of the displayable object, a total number of selected portions included in the screenshot, an amount of time the displayable object is visible, a location of the displayable object on the desktop display, or an identifier of the web page.

The method may also include determining that the screenshot should be sent to the server system and, in response to determining that the screenshot should be sent to the server system, sending the screenshot to the server system. Determining that the screenshot should be sent to the server system may include determining, based on characteristics of the web page, that an upload instruction request should be sent to the server system; in response to determining that an upload instruction request should be sent to the server system, sending the upload instruction request to the server system; receiving an upload instruction response to the upload instruction request, the upload instruction response indicating the screenshot should be uploaded; and in response to receiving the upload instruction response, sending the screenshot to the server system. The upload instruction request may include an identifier of the web page, information about the characteristics of the web page, and a hash of the displayable object. The method may include blurring at least a portion of the screenshot prior to sending the screenshot to the server system. Determining that the screenshot should be sent to the server system may include determining that the screenshot should be sent to the server system based on characteristics of the web page.

The displayable object may be in a raster-based image file format or a non-raster based format.

In another aspect, a method includes receiving, at a server system and from a client system, display information about a displayable object. The client system is configured to access the displayable object; select one or more portions of the accessed displayable object; access a screenshot of a client system display; determine that the accessed screenshot includes the one or more selected portions of the displayable object; in response to determining that the accessed screenshot includes the one or more selected portions, determine the display information about the displayable object; and send the determined display information to the server system. The method also includes estimating a number of users exposed to the displayable object based on the received display information.

Implementations may include one or more of the following features. For example, the displayable object may be a component of a web page. The method may include sending a set of business rules to the client system such that the client system determines, based on the accessed business rules, that the accessed displayable object is a web page component to be monitored. The business rules may designate sizes of displayable objects to be monitored, formats of displayable objects to be monitored, sources of displayable objects to be monitored, or sources of displayable objects to be excluded from monitoring. The display information may include one or more of a hash of the displayable object, a total number of selected portions included in the screenshot, an amount of time the displayable object is visible, a location of the displayable object on the desktop display, or an identifier of the web page.

The method may include receiving the screenshot at the server system from the client system. Receiving the screenshot from the client system at the server system comprises receiving a blurred version of the screenshot from the client system.

The method may also include receiving an upload instruction request from the client system; in response to receiving the upload instruction request, determining that the client system should send the screenshot to the server system; and sending an upload instruction response to the client system such that the client system sends the screenshot to the server system. The upload instruction request may include an identifier of the web page, information about the characteristics of the web page, and a hash of the displayable object.

In another aspect, a system includes at least one client system and at least one server system. The client systems is configured to access a displayable object; select one or more portions of the accessed displayable object; access a screenshot of a client system display; determine that the accessed screenshot includes the one or more selected portions of the displayable object; in response to determining that the accessed screenshot includes the one or more selected portions, determine display information about the displayable object; and send the determined display information to a server system. The server system is configured to receive the display information sent by the client system.

Implementations may include one or more of the following features. For example, the displayable object may be a component of a web page. The server system may be configured to send a set of business rules to the client system. The client system may be configured to receive the set of business rules from the server system, and determine, based on the received business rules, that the accessed displayable object is a web page component to be monitored. The business rules may define web page components to be monitored. For instance, the business rules may designate sizes of displayable objects to be monitored, formats of displayable objects to be monitored, sources of displayable objects to be monitored, or sources of displayable objects to be excluded from monitoring.

The displayable object may be an image. To select one or more portions, the client system may be configured to divide the accessed image into multiple sub-frames, and select a scan line from each of the multiple sub-frames. To determine that the accessed screenshot includes the one or more selected portions, the client system may be configured to determine that the accessed screenshot includes at least one of the selected scan lines. To determine display information about the image, the client system may be configured to determine a total number of the selected scan lines that are included in the accessed screenshot. The display information may include one or more of a hash of the displayable object, a total number of selected portions included in the screenshot, an amount of time the displayable object is visible, a location of the displayable object on the desktop display, or an identifier of the web page.

The client system may be configured to determine that the screenshot should be sent to the server system, and in response to determining that the screenshot should be sent to the server system, send the screenshot to the server system. To determine that the screenshot should be sent to the server system, the client system may be configured to determine, based on characteristics of the web page, that an upload instruction request should be sent to the server system; in response to determining that an upload instruction request should be sent to the server system, send the upload instruction request to the server system; receive an upload instruction response to the upload instruction request, the upload instruction response indicating the screenshot should be uploaded; and in response to receiving the upload instruction response, send the screenshot to the server system. The upload instruction request may include an identifier of the web page, information about the characteristics of the web page, and a hash of the displayable object. The client system may be configured to blur at least a portion of the screenshot prior to sending the screenshot to the server system. To determine that the screenshot should be sent to the server system, the client system may be configured to determine that the screenshot should be sent to the server system based on characteristics of the web page.

The displayable object may be in a raster-based image file format or in a non-raster based format.

In another aspect, a method includes determining that a screenshot of a client system display includes at least a portion of a displayable object that is designated to be monitored and, in response to determining that the screenshot includes at least a portion of the displayable object, determining that the screenshot should be sent to the server system. The method also includes sending the screenshot to the server system in response to determining that the screenshot should be sent to the server system.

Implementations may include one or more of the following features. For example, determining that the screenshot should be sent to the server system may include determining, based on characteristics of the web page, that an upload instruction request should be sent to the server system; sending the upload instruction request to the server system in response to determining that an upload instruction request should be sent to the server system; receiving an upload instruction response to the upload instruction request, the upload instruction response indicating the screenshot should be uploaded; and sending the screenshot to the server system in response to receiving the upload instruction response.

The upload instruction request may include an identifier of the web page, information about the characteristics of the web page, and a hash of the displayable object. The method may also include blurring at least a portion of the screenshot prior to sending the screenshot to the server system. Determining that the screenshot should be sent to the server system may include determining that the screenshot should be sent to the server system based on characteristics of the web page.

In another aspect, a method includes receiving, at a server system and from a client system, a screenshot of a client system display that includes at least a portion of a displayable object that is designated to be monitored. The client system is configured to determine that the screenshot includes at least a portion of the displayable object that is designated to be monitored and, in response to determining that the screenshot includes at least a portion of the displayable object, determine that the screenshot should be sent to the server system. The client system is also configured to send the screenshot to the server system in response to determining that the screenshot should be sent to the server system.

Implementations may include one or more of the following features. For example, the method may include receiving an upload instruction request from the client system; determining that the client system should send the screenshot to the server system in response to receiving the upload instruction request; and sending an upload instruction response to the client system such that the client system sends the screenshot to the server system. The upload instruction request may include an identifier of the web page, information about the characteristics of the web page, and a hash of the displayable object. Receiving the screenshot may include receiving a blurred version of the screenshot from the client system.

In another aspect, a system includes at least one client system and at least one server system. The client system is configured to determine that a screenshot of a client system display includes at least a portion of a displayable object that is designated to be monitored; determine that the screenshot should be sent to the server system in response to determining that the screenshot includes at least a portion of the displayable object; and send the screenshot to the server system in response to determining that the screenshot should be sent to the server system. The server system is configured to receive the screenshot from the client system.

Implementations may include one or more of the following features. For example, to determine that the screenshot should be sent to the server system, the client system is configured to determine, based on characteristics of the web page, that an upload instruction request should be sent to the server system; send the upload instruction request to the server system in response to determining that an upload instruction request should be sent to the server system; receive an upload instruction response to the upload instruction request, the upload instruction response indicating the screenshot should be uploaded; and send the screenshot to the server system in response to receiving the upload instruction response. The upload instruction request may include an identifier of the web page, information about the characteristics of the web page, and a hash of the displayable object. The client system may be configured to blur at least a portion of the screenshot prior to sending the screenshot to the server system. To determine that the screenshot should be sent to the server system, the client system may be configured to determine that the screenshot should be sent to the server system based on characteristics of the web page.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

In general, a monitoring application installed on a client system of a user may determine whether particular displayable objects in a web page (for example, advertising or other images) were visible on the display screen of the client system. For example, in one implementation, the monitoring application captures a copy of an advertising image when the advertising image is received from a web server at the client system, and selects a portion of the image (for example, a scan line from each of four sub-frames of the image may be selected). At other times, the advertising image may already be cached at the client system and, as a result, the web server may return a Hypertext Transfer Protocol (HTTP) response code of 304, which instructs the browser to use the cached copy. In this case, the monitoring application may access the advertising image from the client system's cache. In either event, the monitoring application then periodically or aperiodically captures a screenshot of the client system display. The selected portion of the image is compared to the screenshot to detect whether the screenshot includes the selected portion, thereby indicating that the advertising image (or at least a portion of the image) is displayed in a visible portion of the screen. Information about the display of the advertising image may be sent to a server system.

Figure 1:
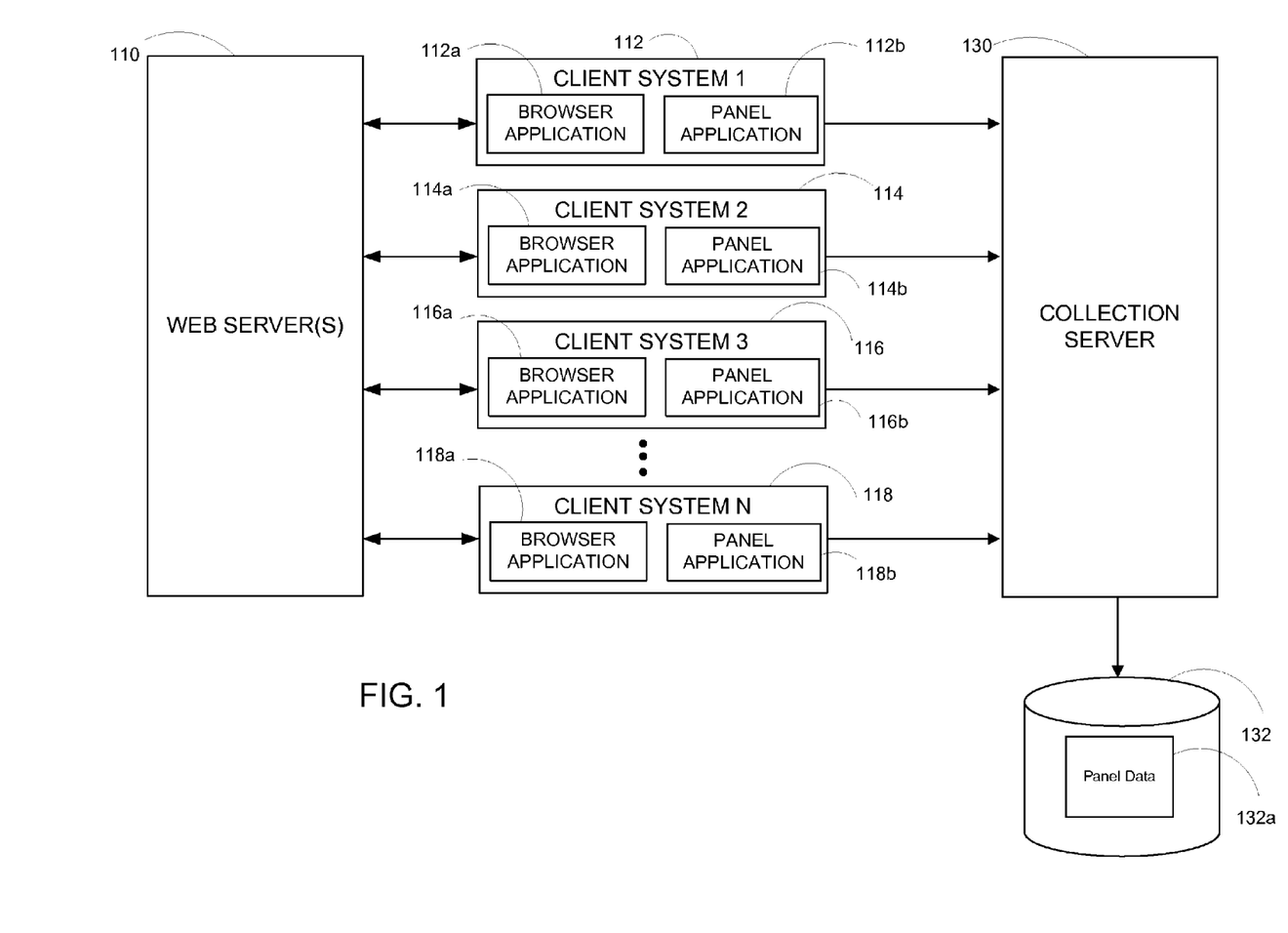
FIG. 1 illustrates an example of a system in which a panel of users may be used to perform Internet audience measurement.

FIG. 1 illustrates an example of a system 100 in which a panel of users may be used to collect data for Internet audience measurement. The system 100 includes client systems 112, 114, 116, and 118, one or more web servers 110, a collection server 130, and a database 132. In general, the users in the panel employ client systems 112, 114, 116, and 118 to access resources on the Internet, such as web pages located at the web servers 110. Information about this resource access is sent by each client system 112, 114, 116, and 118 to a collection server 130. This information may be used to understand the usage habits of the users of the Internet.

Each of the client systems 112, 114, 116, and 118, the collection server 130, and the web servers 110 may be implemented using, for example, a general-purpose computer capable of responding to and executing instructions in a defined manner, a personal computer, a special-purpose computer, a workstation, a server, or a mobile device. Client systems 112, 114, 116, and 118, collection server 130, and web servers 110 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 112, 114, 116, and 118, collection server 130, and web servers 110.

In the example shown in FIG. 1, the system 100 includes client systems 112, 114, 116, and 118. However, in other implementations, there may be more or fewer client systems. Similarly, in the example shown in FIG. 1, there is a single collection server 130. However, in other implementations there may be more than one collection server 130. For example, each of the client systems 112, 114, 116, and 118 may send data to more than one collection server for redundancy. In other implementations, the client systems 112, 114, 116, and 118 may send data to different collection servers. In this implementation, the data, which represents data from the entire panel, may be communicated to and aggregated at a central location for later processing. The central location may be one of the collection servers.

The users of the client systems 112, 114, 116, and 118 are a group of users that are a representative sample of the larger universe being measured, such as the universe of all Internet users or all Internet users in a geographic region. To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

The users in the panel may be recruited by an entity controlling the collection server 130, and the entity may collect various demographic information regarding the users in the panel, such as age, sex, household size, household composition, geographic region, number of client systems, and household income. The techniques used to recruit users may be chosen or developed to help insure that a good random sample of the universe being measured is obtained, biases in the sample are minimized, and the highest manageable cooperation rates are achieved. Once a user is recruited, a monitoring application is installed on the user's client system. The monitoring application collects the information about the user's use of the client system to access resources on the Internet and sends that information to the collection server 130.

For example, the monitoring application may have access to the network stack of the client system on which the monitoring application is installed. The monitoring application may monitor network traffic to analyze and collect information regarding requests for resources sent from the client system and subsequent responses. For instance, the monitoring application may analyze and collect information regarding HTTP requests and subsequent HTTP responses.

Thus, in system 100, a monitoring application 112b, 114b, 116b, and 118b, also referred to as a panel application, is installed on each of the client systems 112, 114, 116, and 118. Accordingly, when a user of one of the client systems 112, 114, 116, or 118 employs, for example, a browser application 112a, 114a, 116a, or 118a to visit and view web pages, information about these visits may be collected and sent to the collection server 130 by the monitoring application 112b, 114b, 116b, and 118b. For instance, the monitoring application may collect and send to the collection server 130 the URLs of web pages or other resources accessed, the times those pages or resources were accessed, and an identifier associated with the particular client system on which the monitoring application is installed (which may be associated with the demographic information collected regarding the user or users of that client system). For example, a unique identifier may be generated and associated with the particular copy of the monitoring application installed on the client system (referred to as a panelist machine identifier).

As described further below, the monitoring application also may perform operations to determine whether certain content in the web pages is visible on a display of the client system. For example, displayable objects may be included in web pages. However, because of the way web pages are rendered, those objects may or may not be in the visible portion of the browser window and, therefore, may or may not be visible on the display. The monitoring application may determine whether a given object, or other piece of content in a web page, was visible on the display and may send to the collection server 130 information indicating that the object was visible (or not), along with other information such as a screenshot showing the object, the URL of the web page the object is displayed in, and the percentage of the object that was visible. In some cases, the displayable objects may represent advertisements to be displayed to the user.

The collection server 130 aggregates the information received from the client systems and stores this aggregated information in the database 132 as panel data 132a.

The panel data 132a may be analyzed to determine the visitation or other habits of users in the panel, as well as their actual exposure to content (e.g., advertisements or other displayable objects), which may be extrapolated to the larger population of all Internet users. The information collected during a particular usage period (session) can be associated with a particular user of the client system (and/or his or her demographics) that is believed or known to be using the client system during that time period. For example, the monitoring application may require the user to identify his or herself, or techniques such as those described in U.S. Patent Application No. 2004-0019518 or U.S. Pat. No. 7,260,837, both incorporated herein by reference, may be used. Identifying the individual using the client system may allow the information to be determined and extrapolated on a per person basis, rather than a per machine basis. In other words, doing so allows the measurements taken to be attributable to individuals across machines within households, rather than to the machines themselves.

To extrapolate the usage or exposure of the panel members to the larger universe being measured, some or all of the members of the panel are weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected.

The reporting sample of users (those included in the weighting and projection) are weighted to insure that the reporting sample reflects the demographic composition of the universe of users to be measured, and this weighted sample is projected to the universe of all users. This may be accomplished by determining a projection weight for each member of the reporting sample and applying that projection weight to the usage of that member. Similarly, a reporting sample of client systems may be projected to the universe of all client systems by applying client system projection weights to the usage of the client systems. The client system projection weights are generally different from the user projection weights.

The characteristics of the weighted and projected sample (either user or client system) may then be considered a representative portrayal of the defined universe (either user or client system, respectively). Patterns observed in the weighted, projected sample may be assumed to reflect patterns in the universe.

Estimates of visitation or other behavior can be generated from this information. For example, this data may be used to estimate the number of unique visitors (or client systems) visiting certain web pages or groups of web pages, or unique visitors within a particular demographic visiting certain web pages or groups of web pages. This data may also be used to determine other estimates, such as the frequency of usage per user (or client system), average number of pages viewed per user (or client system), and average number of minutes spent per user (or client system).

Additionally, or alternatively, estimates of the number of users to whom a particular advertisement or campaign was visibly displayed on the users' screen may be determined. In other words, estimates may be made of the number of users actually exposed to a given advertisement or advertisements in a campaign.

In one implementation, for advertisements or other displayable objects that are in a raster-based image file format (for example, GIF, JPG, or PNG), the monitoring application inspects all data transmitted to the computer via the HTTP or HTTPS internet protocols. When the monitoring application detects data being received that is a type of displayable object, such as a display advertisement, of a proper type and size (for example, according to the Internet Advertising Bureau (IAB) specifications), the monitoring application processes the one or more frames in the displayable object. For each frame, the monitoring application breaks the frame into sub frames (for example, four) and selects a suitable scan line (for example, one or more rows of pixels) from each of the sub frames. While four sub frames is provided as an example, the monitoring application may break a frame into smaller parts, which may provide a more accurate indication of what percent of the object is visible.

The monitoring application periodically or aperiodically captures a screenshot of the desktop of the user's computer and scans the screenshot to see if one or more of the scan lines is present in the screenshot. The frequency of the desktop scanning and screenshot capture may be configurable by a centralized system, and may be able to be altered. This may allow adjustments to improve user experience. When a match is detected, the amount of time the scan lines are detected and the number of scan lines detected, along with the URL of the web page on which the object was displayed, may be collected and transmitted to the collection server to facilitate the reporting of data to customers.

In one implementation, for advertisements, or other displayable objects, that are in a vector- and/or runtime-based format or, more generally, in a non-pixel or non-raster-based format (for example, SWF or SVG), the monitoring application may operate similar to a raster-based image format, except that the monitoring application may render the file in memory to obtain one or more frames in a pixel-based format so that scan lines can be determined. Alternatively, or additionally, for some non-raster-based objects, the monitoring application may obtain a frame or frames based on system events. For instance, in one implementation, when the monitoring application detects an object in a non-raster-based format and that is of a certain type and size (for example, a SWF object that is an IAB size), the monitoring application hooks into calls to the object from the browser software in a manner possible to access the frame or frames of the displayed object. For instance, in some cases, the browser software may dispatch Draw events (for example, WM_Paint events) to the object via an extensibility model, such as the Component Object Model (COM) or the Cross Platform Component Object Model (XPCOM), letting the object know what part of the object's contents to draw and where the object should draw them. These Draw events may be observed by the monitoring application and include the frame or frames to be drawn in a pixel-based format (or otherwise provide access to those frames). As a result, the monitoring application can access the frame or frames to be displayed from the events and use the accessed frames to detect when the object is displayed on the client system screen using the techniques described in this document.

Figure 2A:
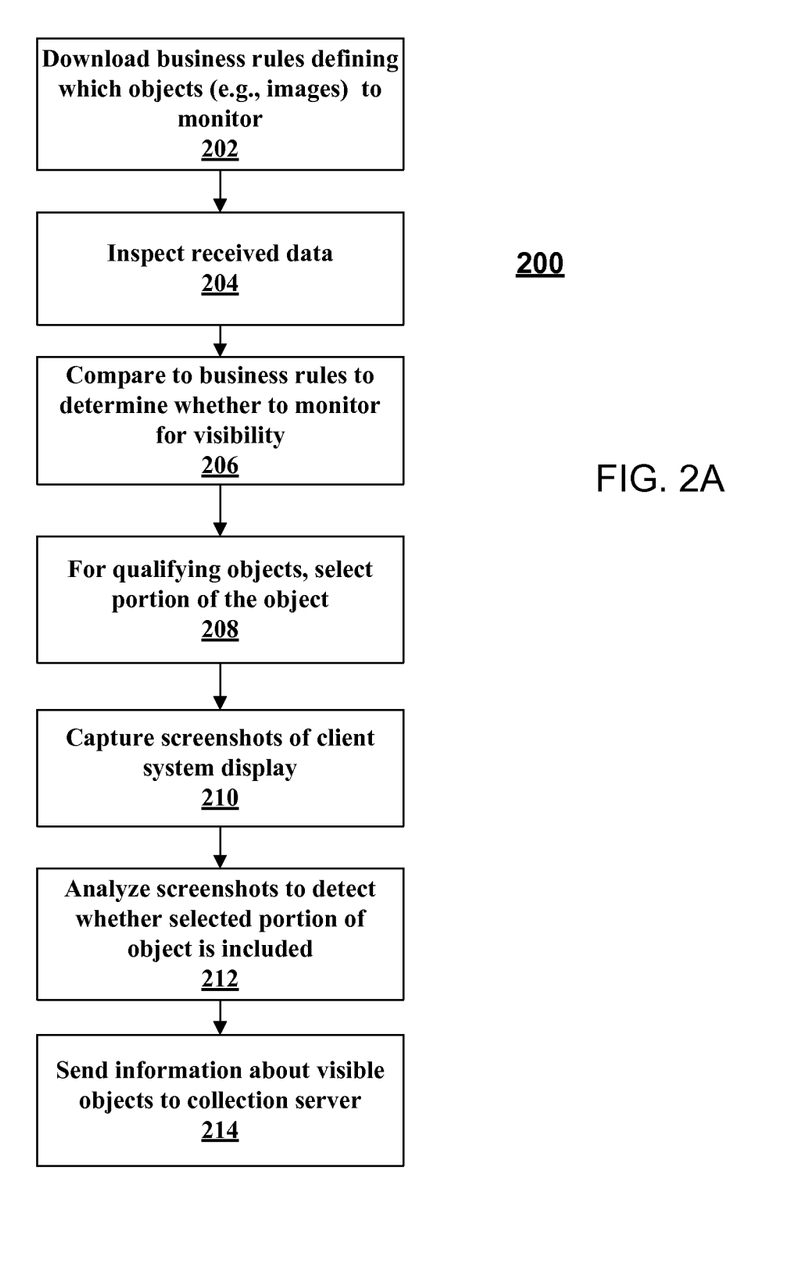
FIG. 2A is a flow chart illustrating a specific example of one implementation of a process for detecting displayable objects in a web page that are visible on a user's screen.

FIG. 2A is a flow chart illustrating a specific example of one implementation of a process 200 for detecting displayable objects (for example, advertisements) in a web page that are visible on a user's screen. The process 200 is described as implemented by the monitoring application described above, but may be implemented by other systems or components.

When the monitoring application begins executing, the monitoring application accesses a central server system and downloads a set of business rules that define which web page components should be monitored (202). For example, the business rules may designate particular image sizes that correspond to known advertising image sizes (for example, as defined by the IAB). Similarly, the business rules may designate certain image or other file formats. The business rules may designate certain sources that should be excluded from inspection. For instance, the business rules may indicate that objects retrieved from the abc.com domain should not be inspected. Alternatively, or additionally, the business rules may designate certain sources for which the objects should be inspected.

The monitoring application then inspects data received at the client system, for example, in response to requests for data sent from the client system (204). For instance, the monitoring application inspects data transmitted to the computer via the HTTP or HTTPS internet protocols. When doing so, the monitoring application may collect the URL of the main, or top-level, web page, and may collect an identifier of the application and window process in which the request was loaded from, and hold this information in cache memory for a specified period of time. Other information, such as characteristics of the web page or other requested resource may be collected and cached. For instance, the web page may include content that indicates screenshots of the web page should be sent to the collection server under certain conditions. The various collected information may be referred to as the page information.

When objects, including advertising and other images, are received at the client system, the monitoring application compares information about the object to the business rules (206). In some cases, the objects may already be cached at the client system and, as a result, the server may return a HTTP response code of 304, which instructs the browser or other application to use the cached copy. In this case, the monitoring application may access the object from the client system's cache.

In either event, if the object qualifies for visibility reporting, one or more portions of the object are selected (208). For instance, when the object is a raster-based image, each image frame may be saved along with the current top level URL from whence the image was loaded. Doing so generally captures the URL of the web page containing the image, along with each image frame. The monitoring application divides each frame into sub frames (for example, four), and a suitable scan line is extracted from each sub frame to be used to detect whether the image is visible on the user's screen.

The monitoring application periodically captures a screenshot of the desktop of the user's computer (210) and scans the screenshot to determine if the selected portion(s) of the object is included in the screenshot (212). For example, in one implementation, the monitoring application scans the screenshot to detect whether one or more of the scan lines is present in the screenshot. For each match that is found on the user's desktop against a sub frame's scan line, the monitoring application accrues the number of sub frames visible for the advertisement image.

In response to determining that the screenshot includes one or more of the selected portions, the monitoring application determines display information about the displayable object (214). For instance, in one implementation, once the monitoring application fails to find any further scan line matches for an image in a specified duration, the monitoring application uploads information about the visible image to the collection server (214). For instance, the monitoring application sends a hash of the image (for example, determined when determining the sub frames), the total number of sub frames matched, the amount of time the image is visible, the location of the image on the screen (for example, min/max x/y of center), URL of the web page in which the image is contained, maximum amount of image that is ever found visible, unique panelist machine identifier, and application name.

In some implementations, the monitoring application determines whether to send a copy of the screenshot to a centralized system (which may be the collection server or other server system) and, if so, sends the screenshot to the centralized system.

Figure 2B:
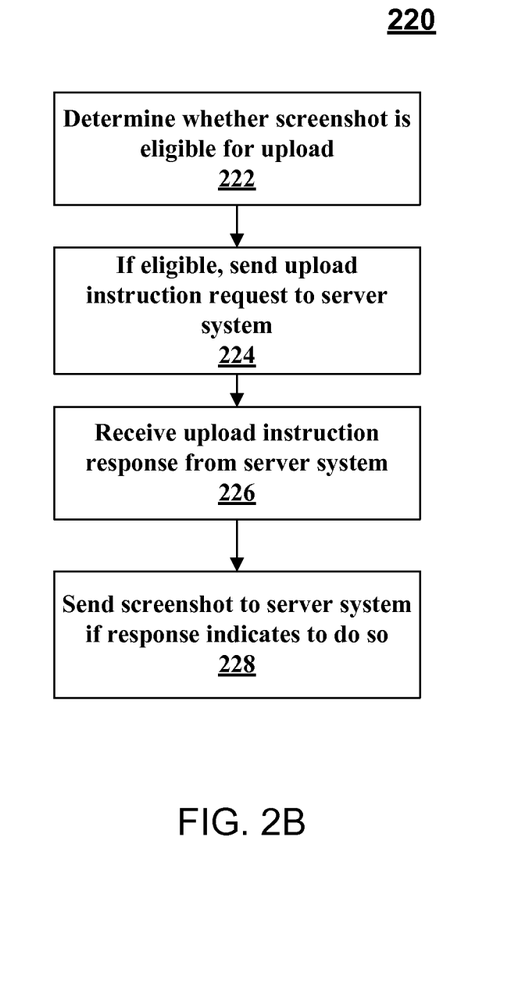
FIG. 2B is a flow chart illustrating a specific example of one implementation of a process for determining whether to send a screenshot to a server system.

FIG. 2B is a flow chart illustrating a specific example of one implementation of a process 220 for determining whether to send a screenshot to a server system. The process 220 is described as implemented by the monitoring application described above, but may be implemented by other systems or components.

In response to detecting that a screenshot of a client system display includes at least a portion of a displayable object that is designated to be monitored, the monitoring application determines whether the screenshot is eligible for uploading to a server system (222). In some cases, there may be conditions on whether or not a screenshot is eligible for uploading. For instance, the screenshot may only be eligible when one or more displayable objects are fully visible in the screenshot and/or the web page includes certain content or characteristics (such as beacon code or other items). Thus, in some implementations, the monitoring application may determine if the object is fully visible, for example, by determining if all sub frames of an image are found in a screenshot of a user's desktop (thereby indicating 100% visibility of the advertisement image).

Alternatively, or additionally, the monitoring application may access the collected page information to determine if the web page has certain characteristics. For instance, if the page information indicates that the web page included code (for example, javascript) matching certain business rules, the monitoring application may store the screenshot. As another example, the page information may indicate that the web page included content that indicates screenshots of the web page should be sent to the collection server under certain conditions.

If the screenshot is eligible, the monitoring application stores the screenshot (if needed) and sends an upload instruction request to a centralized system, such as the collection server or other server system (224). The upload instruction request may include the web page URL, the unique panelist machine identifier, information about the beacon code (or other content or characteristics), and a list of hashes corresponding to displayable objects in the screenshot page with 100% visibility. The request also asks if the screenshot should be uploaded.

The centralized system then determines whether the screenshot should be uploaded and, if so, sends an upload instruction response to the client system, which is received by the client system (226). The decision about whether or not to have the screenshot uploaded may be based, for example, on whether a screenshot for the object has already been uploaded for the particular web page and/or characteristics of the web page (e.g., if certain beacon code is included in the web page). For example, in some implementations, once the centralized system collects the screenshot of an advertisement image on a specific web page (for example, as identified by the URL), the centralized system marks the advertising image as collected for that URL such that that additional requests from a monitoring application for that image screenshot are refused.

If the centralized system gives any valid response (for example, either send screenshot or don't send screenshot), the hash of the objects are stored in the page information so they are not sent again.

If the centralized system responds within a specified period of time indicating that the screenshot is wanted, the monitoring application will send the whole or a portion of the screenshot to the centralized system (228). For example, the monitoring application may trim the screenshot down to the window where the image is found visible, blur this trimmed copy of the screen capture, and upload the screen capture with the page URL, unique panelist machine identifier, all beacon information, and a list of image hashes found 100% visible. The screenshot may be trimmed and blurred to protect panelist privacy.

In some implementations, the handling of the requests to the centralized system about whether or not to upload the screenshot are handled in a separate thread of the monitoring application so to avoid any interference with user experience. Any request that is not responded to within a specified period of time (as specified by the centralized system) may be deleted to prevent consuming excess memory.

In addition, while the implementation of FIG. 2B sends an upload instruction request to the centralized system to determine whether the screenshot should be uploaded, in other implementations the monitoring application may automatically (that is, without requesting instructions from the centralized system) send the screenshot once the monitoring application determines the screenshot is eligible for upload.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method implemented on a client system to determine whether an advertisement to be monitored and configured to be presented on a display device was viewable within a screen of the display device during operation of the display device, the method comprising:
   accessing data received from a web page, by the client system;
   accessing, by the client system, one or more rules designating web page advertising configured for display on the screen of the display device to be monitored, wherein the one or more rules designate one or more of a size of advertising to be monitored, a format of advertising to be monitored, a source of advertising to be monitored, or a source of advertising to be excluded from monitoring;

determining, by the client system, based on the accessed one or more rules, whether the received web page data includes the advertisement to be monitored;

in response to determining the received web page data includes the advertisement to be monitored, dividing, by the client system, the advertisement to be monitored into sub-portions;

capturing, by the client system, a screenshot of the screen of the display device during operation of the display device;

automatically analyzing, by the client system, the captured screenshot to detect whether the captured screenshot includes at least one of the sub-portions of the advertisement to be monitored;

in response to detecting that the captured screenshot includes at least one of the sub-portions, determining, by the client system, information about the display of the advertisement within the screen of the display device; and sending the determined information about the display of the advertisement to a server system.

2. The method of claim 1 wherein the advertisement has a size or a format that corresponds to one of a plurality of predetermined sizes or formats associated with advertising.

3. The method of claim 1 wherein the advertisement to be monitored is an image, and dividing, by the client system, the advertisement to be monitored into sub-portions includes:
dividing the image into multiple sub-frames; and
selecting a scan line from each of the multiple sub-frames.

4. The method of claim 3 wherein automatically analyzing the captured screenshot includes determining whether the captured screenshot includes at least one of the selected scan lines.

5. The method of claim 3 wherein determining information about the display of the advertisement within the screen of the display device includes determining a total number of the selected scan lines that are included in the captured screenshot.

6. The method of claim 1 wherein the information about the display of the advertisement includes one or more of a hash of the advertisement, a total number of sub-portions included in the screenshot, an amount of time the advertisement is visible, a location of the advertisement within the screen of the display, or an identifier of a web page associated with the advertisement.

7. A method comprising:
receiving, at a server system and from a client system, information about the display of an advertisement to be monitored, wherein the client system includes a processing device that is configured to:
access data received from a web page by the client system;
access one or more rules designating web page advertising configured for display on the screen of the display device to be monitored, wherein the one or more rules designate one or more of a size of advertising to be monitored, a format of advertising to be monitored, a source of advertising to be monitored, or a source of advertising to be excluded from monitoring;
determine, based on the accessed one or more rules, whether the received web page data includes the advertisement to be monitored;
in response to determining the received web page data includes the advertisement to be monitored, divide the advertisement to be monitored into sub-portions;
capture a screenshot of a screen of a display device during operation of the display device;
automatically analyze the captured screenshot to detect whether the captured screenshot includes at least one of the sub-portions of the advertisement to be monitored;
in response to detecting that the captured screenshot includes at least one of the sub-portions, determine information about the display of the advertisement to be monitored within the screen of the display device; and
send the determined information about the display of the advertisement to the server system; and
estimating, at the server system, a number of users exposed to the advertisement to be monitored based on the received information about the display of the advertisement.

8. A system comprising:
at least one client system including a processing device configured to:
access data received from a web page, by the client system, and determine whether the received web page data includes an advertisement to be monitored;
in response to determining the received data includes the advertisement to be monitored, divide the advertisement to be monitored into sub-portions;
capture a screenshot of a screen of a display device during operation of the display device;
automatically analyze the screenshot captured during operation of the display device to detect whether the captured screen shot includes at least one of the sub-portions of the advertisement to be monitored;
in response to detecting that the captured screenshot includes at least one of the sub-portions, determine information about the display of the advertisement within the screen of the display device; and
send the determined information about the display of the advertisement to a server system; and
at least one server system configured to receive the information about the display of the advertisement sent by the client system,
wherein the server system is configured to provide one or more rules to the client system, the one or more rules designating web page advertising to be monitor including designating one or more of a size of advertising to be monitored, a format of advertising to be monitored, a source of advertising to be monitored, or a source of advertising to be excluded from monitoring; and the at least one client system is configured to: access the one or more rules provided by the server system; and determine, based on the accessed one or more rules, that the received data includes an advertisement that is a web page advertising to be monitored.

9. The system of claim 8 wherein the advertisement to be monitored has a size or a format that corresponds to one of a plurality of predetermined sizes or formats associated with advertising.

10. The system of claim 8 wherein the advertisement to be monitored is an image, and to divide the advertisement to be monitored into sub-portions, the client system is configured to:
divide the image into multiple sub-frames; and
select a scan line from each of the multiple sub-frames.

11. The system of claim 10 wherein, to automatically analyze the captured screenshot, the client system is configured to determine whether the captured screenshot includes at least one of the selected scan lines.

12. The system of claim 10 wherein, to determine information about the display of the advertisement within the screen of the display device, the client system is configured to determine a total number of the selected scan lines that are included in the captured screenshot.

13. The system of claim 8 wherein the determined information about the display of the advertisement includes one or more of a hash of the advertisement, a total number of sub-portions included in the screenshot, an amount of time the advertisement is visible, a location of the advertisement within the screen of the display, or an identifier of a web page associated with the advertisement.

14. A method implemented on a client system to determine whether an advertisement designated to be monitored was viewable within a screen of a display device during operation of the display device, the method comprising:
    accessing, by the client system, one or more rules designating web page advertising configured for display on the screen of the display device to be monitored, wherein the one or more rules designate one or more of a size of advertising to be monitored, a format of advertising to be monitored, a source of advertising to be monitored, or a source of advertising to be excluded from monitoring; and
    determining, by the client system based on the accessed one or more rules, an advertisement that is designated web page advertising to be monitored;
    dividing, by the client system, the advertisement designated to be monitored into sub-portions;
    capturing, by the client system, a screenshot of the screen of the display device during operation of the display device;
    automatically analyzing, by the client system, the captured screenshot to detect whether the captured screenshot includes at least one of the sub-portions of the advertisement that is designated to be monitored;
    in response to detecting that the captured screenshot includes at least one of the sub-portions of the advertisement, determining that the captured screenshot should be sent to a server system; and
    in response to determining that the captured screenshot should be sent to the server system, sending the captured screenshot to the server system.

15. The method of claim 14 wherein determining that the captured screenshot should be sent to the server system comprises:
    determining, based on characteristics of the web page associated with the advertisement designated to be monitored, that an upload instruction request should be sent to the server system;
    in response to determining that an upload instruction request should be sent to the server system, sending the upload instruction request to the server system;
    receiving an upload instruction response to the upload instruction request, the upload instruction response indicating the accessed screenshot should be uploaded;
    in response to receiving the upload instruction response, sending the accessed screenshot to the server system.

16. The method of claim 15 wherein the upload instruction request includes an identifier of the web page, information about the characteristics of the web page, and a hash of the advertisement designated to be monitored.

17. The method of claim 15 further comprising blurring at least a portion of the captured screenshot prior to sending the captured screenshot to the server system.

18. The method of claim 14 wherein determining that the captured screenshot should be sent to the server system comprises determining that the captured screenshot should be sent to the server system based on characteristics of the web page associated with the advertisement designated to be monitored.

19. A client system configured to determine whether an advertisement was visible on a display, the system comprising:
    one or more storage devices configured to store a monitoring application including instructions that when executed determine whether an advertisement was visible on a display; and
    one or more processing devices of the client system configured to access the instructions and to execute the instructions causing the one or more processing devices to:
    access one or more rules designating web page advertising configured for display on the screen of the display device to be monitored, wherein the one or more rules designate one or more of a size of advertising to be monitored, a format of advertising to be monitored, a source of advertising to be monitored, or a source of advertising to be excluded from monitoring;
    inspect data received by the client device to determine, based on the one or more rules, whether the received data includes an advertisement to be monitored;
    divide an advertisement to be monitored that is determined to be included in the received data into sub-portions;
    periodically capture screenshots of at least a portion of a display screen associated with operation of the client system;
    automatically analyze the captured screenshots to detect whether at least one sub-portion of the advertisement to be monitored that is determined to be included in the received data appears in a corresponding captured screenshot; and
    transmit information to a collection server regarding the sub-portion of the advertisement to be monitored that is determined to be included in the received data and is detected in the corresponding captured screenshot.

20. The system of claim 19 wherein at least one of the one or more processing devices of the client system is further configured to access the instructions and to execute the instructions causing the at least one of the one or more processing devices to:
    divide the advertisement to be monitored that is determined to be included in the received data into multiple sub-frames; and
    automatically analyze the captured screenshots by selecting a scan line from each of the multiple sub-frames and determining that the captured screenshot includes at least one of the selected scan lines.

21. The system of claim 19 wherein at least one of the one or more processing devices of the client system is further configured to access the instructions and to execute the instructions causing the at least one of the one or more processing devices to:
    process the advertisement to be monitored that is determined to be included in the received data to determine whether the advertisement is in a non-pixel or non-raster-based format;

rendering the advertisement determined to be in a non-pixel or non-raster-based format in a storage device to obtain one or more frames of the advertisement in a pixel-based format;
determining a scan line from each of the one or more frames; and
automatically analyze the captured screenshots to determine whether the captured screenshot includes at least one scan line.

\* \* \* \* \*